United States Patent [19]
Ito et al.

[11] Patent Number: 5,888,325
[45] Date of Patent: Mar. 30, 1999

[54] DECORATIVE FLORAL ARTICLE

[76] Inventors: Yoichiro Ito, 5003 Malvern Dr., Bethesda, Md. 20817; Lin Qi, 1001 Rockville Pike, Apt. 418, Rockville, Md. 20852

[21] Appl. No.: 694,319

[22] Filed: Aug. 8, 1996

[51] Int. Cl.⁶ .................................................. A01G 5/00
[52] U.S. Cl. ................... 156/57; 47/55; 206/575; 427/4; 428/24
[58] Field of Search ................... 47/55; 156/57; 206/575; 428/24

[56] References Cited

U.S. PATENT DOCUMENTS

| | | | |
|---|---|---|---|
| 3,744,152 | 7/1973 | Crasilneck | 434/84 |
| 3,802,122 | 4/1974 | Dickinson | 47/55 |
| 4,281,474 | 8/1981 | Gallo | 428/24 X |
| 4,584,042 | 4/1986 | Wandroik | 206/575 X |
| 4,808,447 | 2/1989 | Baker | 428/24 X |
| 5,120,583 | 6/1992 | Garcia | 428/24 |
| 5,252,537 | 10/1993 | De Winter-Scailteur | 428/24 X |
| 5,399,392 | 3/1995 | Sellegaard | 428/24 |

*Primary Examiner*—Henry F. Epstein
*Attorney, Agent, or Firm*—Nikaido, Marmelstein, Murray & Oram LLP

[57] ABSTRACT

There are provided decorative articles, and methods of making decorative articles, by applying adhesive and coloring agent to a plant, such as a dandelion, the plant having a stalk and an achene assembly, the achene assembly including a receptacle and a plurality of pappus structures; and then drying the adhesive and coloring agent. Also provided are kits for use in such methods.

6 Claims, 6 Drawing Sheets

5,888,325

DECORATIVE FLORAL ARTICLE

FIELD OF THE INVENTION

The present invention is directed to a decorative article, in particular, a decorative article which is made through the use of a plant, as well as a method of making such a decorative article and a kit for use in making such a decorative article.

BACKGROUND OF THE INVENTION

There exists an ongoing need for decorative articles, particularly decorative articles containing plants, which are aesthetically pleasing, inexpensive and which remain aesthetically pleasing for a longer time.

SUMMARY OF THE INVENTION

Dandelions (Taraxacum officinale), well-known as common perennial weeds, belong to the composite family. At certain times during their lifetimes, dandelions are characterized by a structure (see FIG. 2) including a stalk 10 and an achene assembly 11, the achene assembly 11 including a receptacle 12 and numerous achene structures 13, each achene structure including a seed 14 and a pappus assembly 15. At a stage of development, the achene assembly changes from a closed arrangement (see FIG. 1) to an open arrangement (see FIG. 2). In accordance with the present invention, the present inventors embarked on determining a method of using the stalk 10 and achene assembly 11 of a dandelion in an open arrangement to make a decorative article. However, as is well known, the achene structures of a dandelion in an open arrangement as shown in FIG. 2 are very easily separated from the receptacle of the dandelion, e.g., by a small gust of wind.

In accordance with the present invention, there is provided a method of making a decorative article using a dandelion or the like, comprising applying adhesive and coloring agent to the plant, and then drying the adhesive and the coloring agent to provide a decorative article in which the achene structures are adhered to the receptacle, and in which at least the achene structures are colored by the coloring agent.

The method according to the present invention preferably further comprises inserting a supporting element into the stalk of the plant and into the receptacle of the plant. This step of inserting a supporting element into the stalk of the plant is preferably conducted after the step of applying adhesive and coloring agent, although it can be conducted before applying either or both of the adhesive and the coloring agent.

A preferred method of making a decorative article in accordance with the present invention comprises applying an adhesive to the achene structures, then drying the adhesive, then applying the coloring agent to the achene structures, and then drying the coloring agent.

The present invention is also directed to a decorative article comprising a stalk, a receptacle and a plurality of achene structures obtained from a plant, in which the achene structures have applied thereto an adhesive and a coloring agent. In a preferred aspect, the decorative article according to the present invention further includes a supporting element positioned within the stalk and extending into the receptacle.

The present invention further provides a kit for use in making a decorative article, the kit comprising adhesive and coloring agent (either separately or together) suitable for use in applying to the plant. The kit in accordance with the present invention preferably further comprises at least one supporting element suitable for inserting into the stalk and the receptacle of the plant.

The invention may be more fully understood with reference to the accompanying drawings and the following description of the embodiments shown in those drawings. The invention is not limited to the exemplary embodiments and should be recognized as contemplating all modifications within the skill of an ordinary artisan.

BRIEF DESCRIPTION OF THE DRAWING FIGURES

DETAILED DESCRIPTION OF THE PREFERRED EMBODIMENTS

The present invention can be applied to various types of vegetation, most particularly to dandelions and similar plants. The present invention can also be applied to other families of plants, such as milkweed.

The present invention can be applied to achene assemblies which have either been removed from the living plant, or the present invention can be applied to a living plant in situ. For example, the present invention can be applied to plants in situ to obtain the benefit of preventing (or delaying) achene structures (which include the seeds for the dandelion) from leaving the receptacle and germinating.

Figure 1:
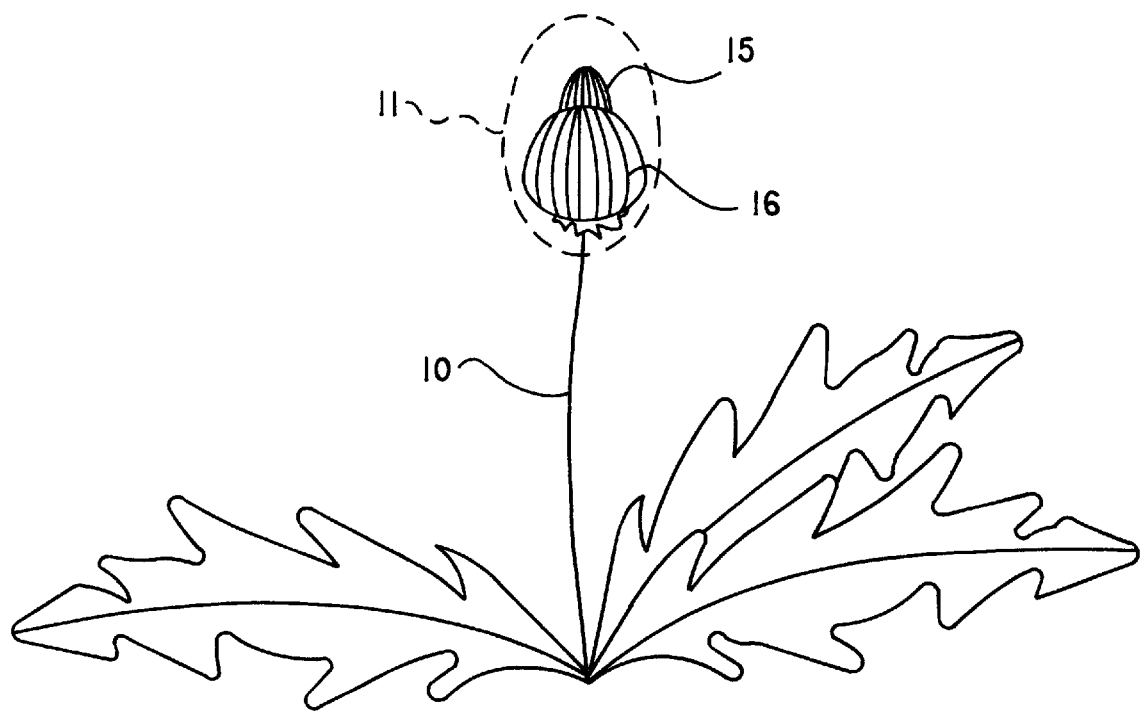
FIG. 1 is an illustration of a dandelion in which the achene assembly is in a closed arrangement.
Figure 2:
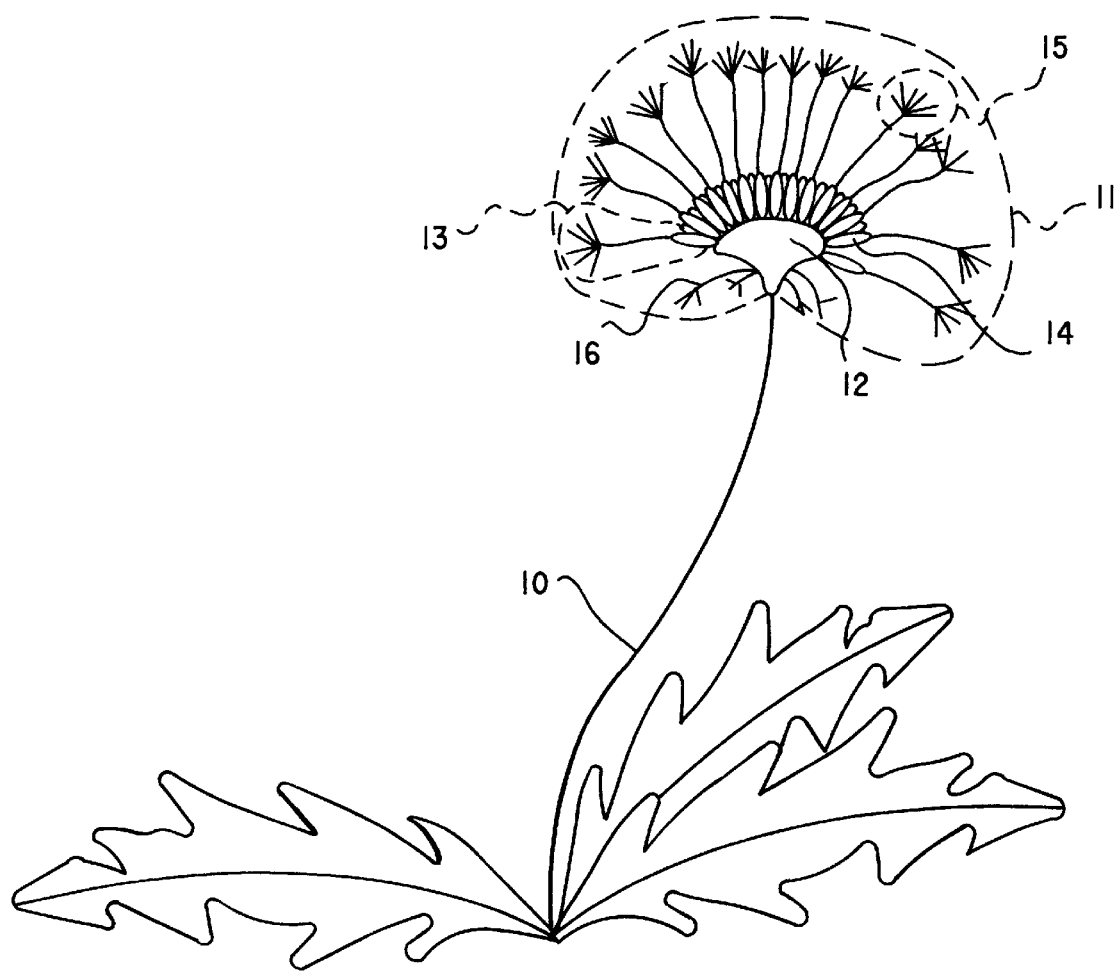
FIG. 2 is an illustration of a dandelion in which the achene assembly (cross-sectional view) is in an open arrangement.

When removing a stalk and attached achene assembly from a living plant to obtain a cutting, (i.e., a cut stalk and attached achene assembly), it is preferable to select a stalk which has an achene assembly in a closed arrangement (see FIG. 1) instead of an open arrangement (FIG. 2). The primary benefit obtained by selecting structures having an achene assembly in a closed arrangement is that a fully open achene assembly is easily damaged by wind, water, contact or vibration. The closed achene assembly typically has a white tuft of pappi sticking out from a green inner bract 16.

The harvested stalk 10 and attached achene assembly 11 having a closed arrangement is then preferably placed so that at least part of the stalk on the end of the stalk remote from the receptacle (i.e., the part which was cut) is in water, and maintained in this arrangement until the achene assembly 11 opens and assumes the arrangement of an open achene assembly. This usually occurs within two or three days after placing the stalk of the cutting in water. After the achene assembly has fully opened, the adhesive and the coloring agent can be applied and dried.

The application of the adhesive and coloring agent is preferably carried out by first applying adhesive to the achene assembly, then drying the adhesive, then applying coloring agent to the achene assembly, and then drying the coloring agent. Alternatively, the adhesive and the coloring agent can be combined in a single composition and applied to the achene assembly simultaneously, followed by drying the adhesive and coloring agent. The adhesive is preferably applied by spraying and the coloring agent is also preferably applied by spraying, although either or both materials can be applied by any other means.

In accordance with the present invention, the amount of adhesive and coloring agent should be sufficient to adequately adhere the achene structures to the receptacle and provide the desired coloring effect on the achene assembly, but should also be minimized to avoid adding too much weight to the achene structures, which can cause some of the structures to break off the receptacle.

During the drying step or steps, the stalk of the cutting (i.e., the stalk and attached achene assembly) is preferably maintained in water.

After the adhesive and coloring agent have been applied and dried, the stalk and attached achene assembly can be treated as a cut flower, and will typically be useful as a decorative article for about 7–10 days, after which a portion of the stalk tends to wither.

Figure 4:
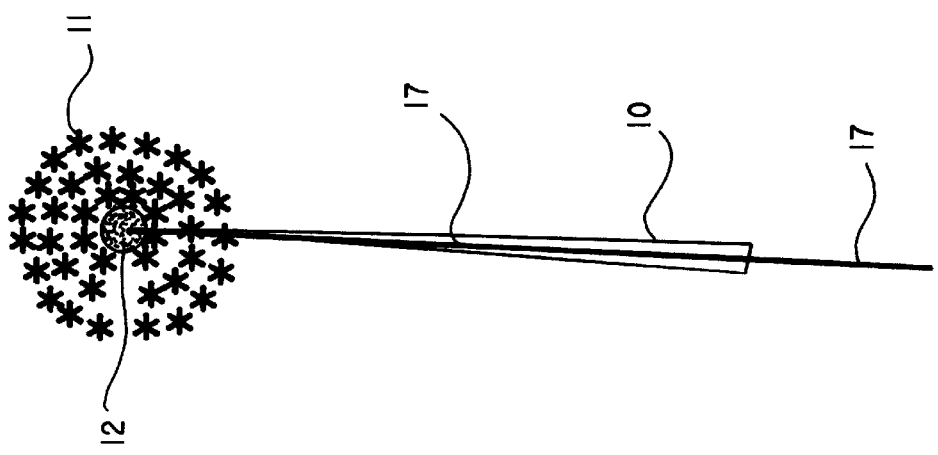
FIG. 4 is an illustration of a decorative article made in accordance with the present invention which includes a stalk, an achene assembly to which adhesive and coloring agent have been applied, and a supporting element positioned inside the stalk and extending into the receptacle.
Figure 3:
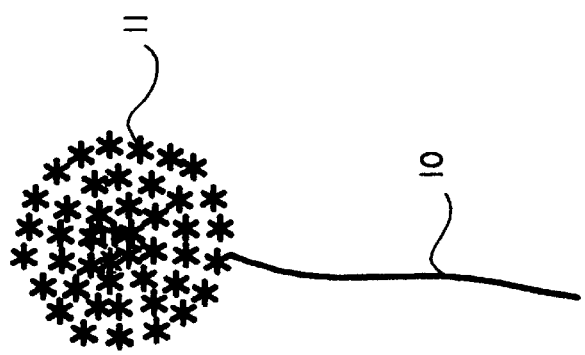
FIG. 3 is an illustration of a decorative article made in accordance with the present invention, including a stalk and an achene assembly to which adhesive and coloring agent have been applied.

In accordance with a preferred aspect of the present invention, after the adhesive and coloring agent have been applied and dried, a supporting element 17 can be inserted into the cut end of the stalk (i.e., the end of the stalk remote from the receptacle) and pushed through the stalk 10 and then into the receptacle 12 (see FIG. 4). The end of the wire first inserted into the stalk preferably pierces through the receptacle by a length of several millimeters (2–3 mm) in order to rigidly hold the supporting structure in the receptacle. It is preferred that the supporting element not extend above the receptacle and into the seeds, because this may detract from the appearance of the cutting. After inserting a supporting element in this manner, the cutting is preferably maintained in a dry condition. The useful life of a cutting formed in this way is generally well over one month, probably beyond one year if kept in a sheltered place.

The supporting element 17 can be made out of any suitable material, and preferred materials include metal wires or pipes (e.g., copper or iron), plastic, bamboo and the like. Where pipes are used as the supporting element, it is possible to deliver chemicals through the pipe or to accommodate an optical fiber within the pipe to illuminate the decorative product. The supporting element preferably has an outer diameter roughly equal to the inner diameter of the stalk. For example, a suitable outer diameter for the supporting element is in the range of from about 0.8 to about 1.2 mm.

As an alternative, the supporting element 17 can be inserted into the stalk 10 and the receptacle 12 before the application of the adhesive and coloring agent (but after the achene assembly 11 has opened). In such a case, the cutting is preferably maintained in a dry condition thereafter (i.e., the stalk is not placed in water).

In addition, a fragrance can be applied to the cutting, either together with the adhesive and/or coloring agent, or as a separate step.

Figure 5:
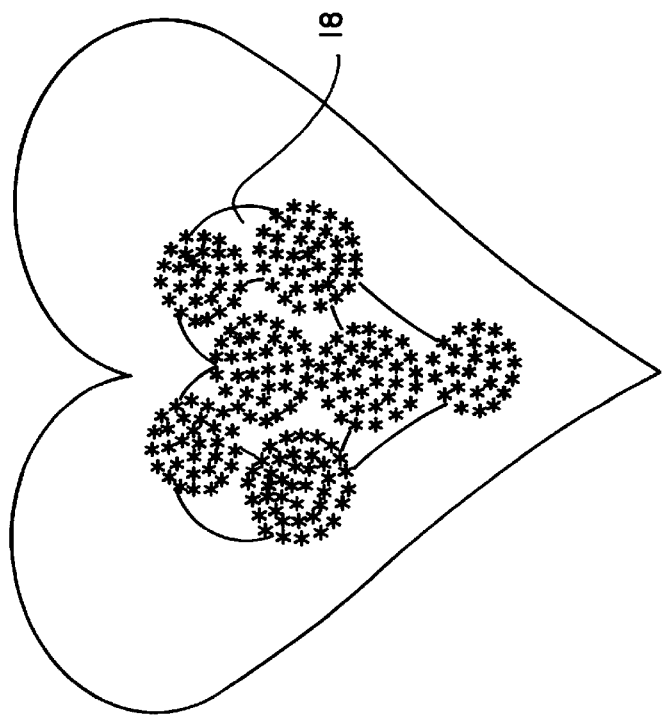
FIGS. 5–9 are illustrations of displays including decorative articles according to the present invention.
Figure 6:
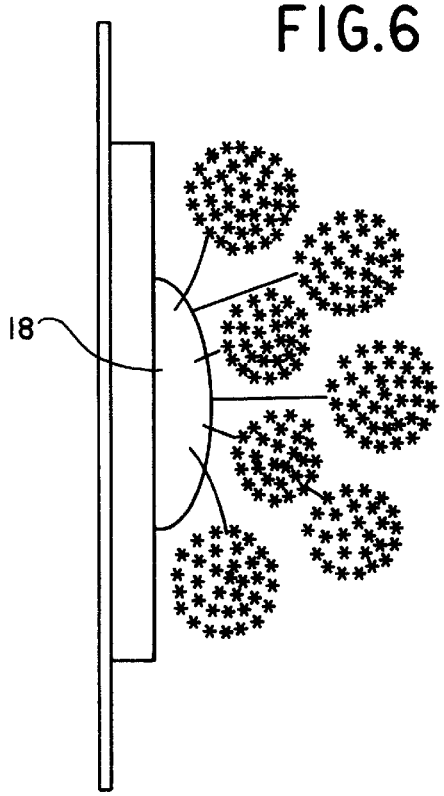
Figure 7:
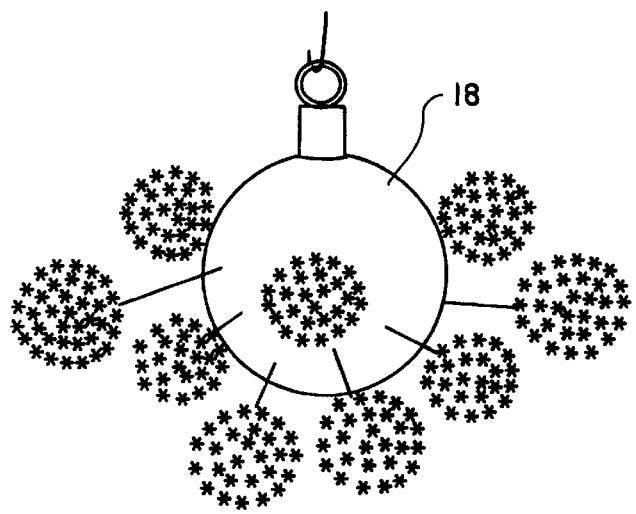
Figure 8:
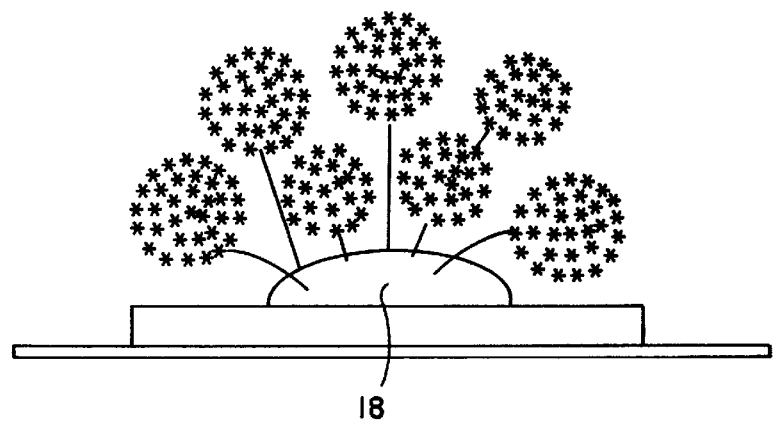
Figure 9:
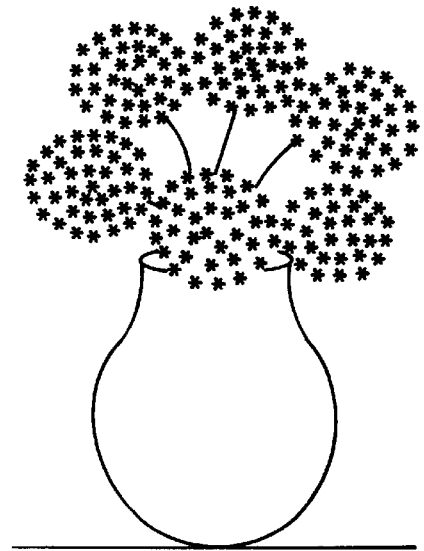
Figure 10:
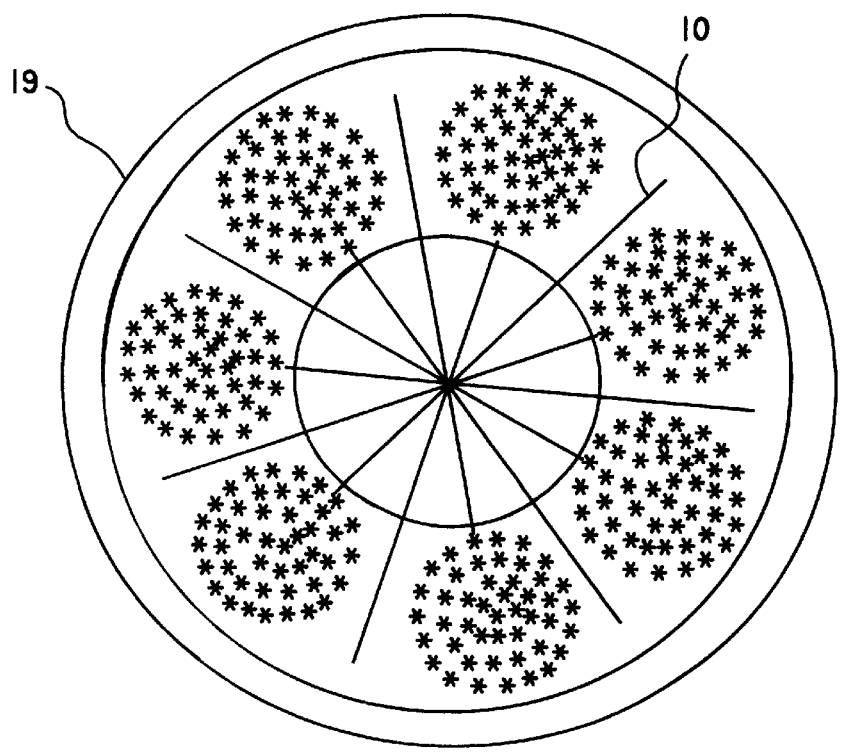
FIG. 10 is a top view of a package 19 containing decorative articles according to the present invention.
Figure 11:
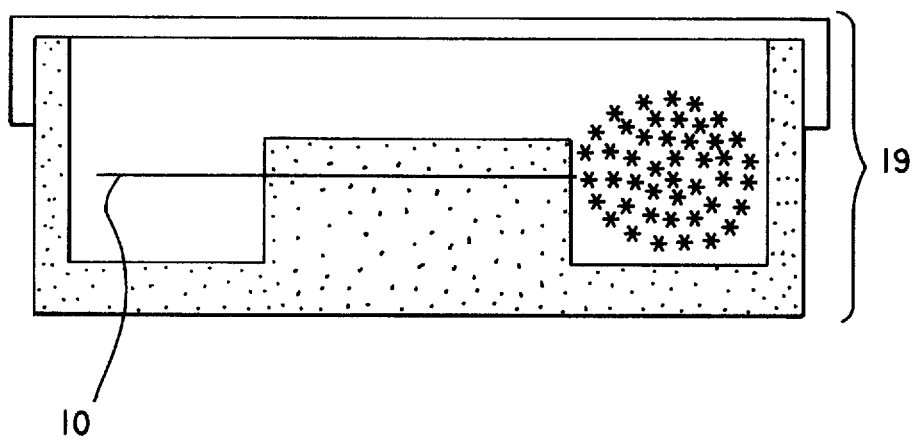
FIG. 11 is a side view of the package 19 shown in FIG. 10.

The finished article according to the present invention can be used in a variety of ways, e.g., as a table top flower arrangement, a wall decoration, an element in a wreath, etc. For example, FIG. 9 shows a vase with six finished articles positioned inside the vase. Also, in a preferred aspect of the present invention, one or more foam cores 18 may be provided, into which one or more finished articles (which each include a supporting element) can be inserted by inserting the end of the stalk remote from the receptacle into the foam core, for example, see FIG. 5, FIG. 6 (which is mounted on a wall), FIG. 7 (which is a hanging device including a foam sphere, into which a plurality of finished artcles are inserted), and FIG. 8 (which is a table top arrangement).

The adhesive in accordance with the present invention can broadly be any material which is effective for strengthening the adhesion between the achene structures and the receptacle. For example, suitable materials for use as the adhesive include vinyl resins, such as polyvinylpyrrolidone (PVP) having a molecular weight (MW) of about 370,000, polyvinyl acetate and polyvinyl chloride, acrylic resins, such as polyacrylic resin, cellulose derivatives, such as ethyl cellulose, cellulose acetate and cellulose nitrate, ethylene glycol polymers, such as polyethylene glycol (MW=20,000) (i.e., "PEG 20,000"), oxyethylene polymers, such as polyoxyethylene 2-cetyl ether, butylene polymers, such as polyisobutylene (MW=420,000 and 4,700,000), and other polymers, such as paraffin, vinyl acetate/crotonic acid/vinyl neodecanoate copolymer. Hydrophobic materials such as polyisobutylene and paraffin are preferably dissolved in hexane while other materials can be dissolved in ethanol at concentrations in the range of from 1 to 5%, depending on their solubilities. By way of example, a suitable composition may comprise SD alcohol 40, water, propane, isobutane, vinyl acetate/crotonic acid/vinyl neodecanoate copolymer, aminoethyl propanol, fragrance, ammonium hydroxide, and ammonium benzoate.

The list of representative types of materials for the adhesive in accordance with the present invention should not be considered to be limiting, and those of skill in the art can readily test various materials by following the procedures described herein to determine whether the material satisfies the function of the adhesive, which is to prolong the length of time during which achene structures remain attached to the receptacle.

As the coloring agent in accordance with the present invention, any suitable material can be used which is effective to impart color to the achene structures. For example, suitable materials for use as the coloring agent include a wide variety of paint materials, particularly spray paints, including standard colors, watercolors, and fluorescent colors. Those of skill in the art are familiar with many types of such materials, and can readily test various materials by following the procedures described herein to determine whether the material is effective for providing coloring. By way of example, a suitable composition can comprise ketone, xylene, propane, isobutane, toluene, hexane, heptane, and naphtha.

The present inventors have found that surprisingly, by following the procedures of the present invention, it is possible to color open achene assenblies of dandelions and obtain a decorative colored article which lasts for a considerable length of time (more than one month), without significant loss of achene structures from the achene assenbly during coloring, particularly by spraying the adhesive and coloring agent (or combination of the two).

Figure 12:
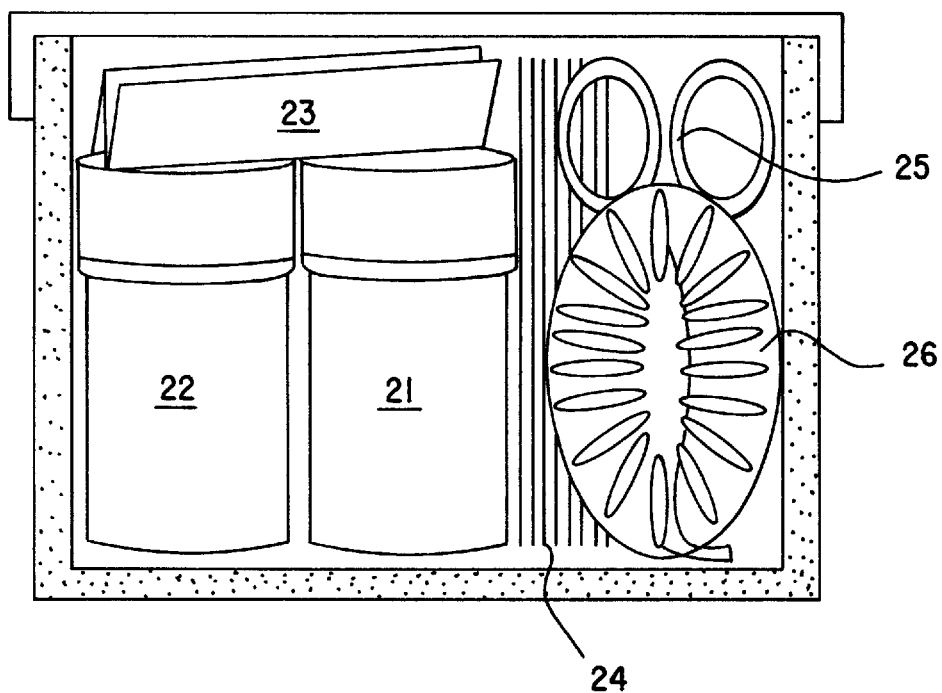
FIG. 12 is an illustration of a kit in accordance with the present invention.

The present invention is also directed to a kit containing adhesive and coloring agent, preferably in separate containers. The kit may further comprise one or more suitable supporting element or material (e.g., wire) which can be used to make a supporting element (in which case a cutting element, such as a wire cutter, may also be provided). The kit according to the present invention may also include a mask to protect the user during the application (e.g., spraying) of the adhesive and the coloring agent. The kit may also include one or more decorative board or sphere, e.g., made of styrofoam. In addition, the kit may include instructions detailing the preferred use of the elements in the kit, as described herein. FIG. 12 shows a kit containing adhesive spray 21, spray paint 22, instructions 23, wire 24, a wire cutter 25 and a mask 26.

EXAMPLES

In order to demonstrate the effectiveness of the present invention, numerous experiments, as discussed below, were conducted. In these experiments, in each case, adhesive and/or coloring agent were applied to a number of cuttings and then, at subsequent times, the condition of each cutting was observed, in particular, the cuttings were observed to determine whether there was partial detachment of the achene structures, total detachment of the achene structures, or deformation of the cutting. Table 1 shows the date of each treatment, the number of cuttings treated, the adhesive (fixative) and the coloring agent (color). In Table 1, "--" indicates that no treatment was conducted, "A" indicates that adhesive spray was used, "B" and "C" both indicate that the adhesive spray containing SD alcohol 40, water, propane, isobutane, vinyl acetate/crotonic acid/vinyl neodecanoate copolymer, aminoethyl propanol, fragrance, ammonium hydroxide, and ammonium benzoate was used, "D" indicates that spray paint was used, "+" indicates heavier application, "*" indicates that the adhesive was applied both before and after insertion of a supporting element, "" indicates that the adhesive was applied both before and after the coloring agent was applied, "**" indicates that the adhesive and coloring agent were applied simultaneously, "pece" refers to polyoxyethylene 2-cetyl ether, "immature" indicates that the achene assembly was picked at an immature stage, i.e., at a stage where it is a semispherical fluffy tuft resembling thisthles (by using an immature achene assembly, it is possible to obtain a decorative article in accordance with the present invention), and "cont" refers to a control group.

The results of these observations are listed in Tables 2–7 below (in each case, the date of the observation is listed next to the Table number).

TABLE 1

| No. | Date of Treatment | Fixative | Color | Number of Balls |
|---|---|---|---|---|
| 1 | May 11, 1996 | A | D | 15 |
| 2 | May 18, 1996 | — | D | 9 |
| 3 | May 18, 1996 | A | D | 17 |
| 4 | May 18, 1996 | A | D | 12 |
| 5 | May 18, 1996 | A | D+ | 9 (bicolor) |
| 6 | May 25, 1996 | A | D | 9 |
| 7 | May 25, 1996 | B | D | 9 |
| 8 | May 25, 1996 | C | D | 8 |

TABLE 1-continued

| No. | Date of Treatment | Fixative | Color | Number of Balls |
|---|---|---|---|---|
| 9 | May 26, 1996 | — | D | 6 |
| 10 | May 26, 1996 | B | D+ | 11 |
| 11 | May 27, 1996 | B | D+ | 4 (bicolor) |
| 12 | May 28, 1996 | B | D | 6 (immature) |
| 13 | May 30, 1996 | B+* | D | 9 |
| 14 | June 2, 1996 | B+** | D | 4 |
| 15 | June 2, 1996 | B | D+ | 13 |
| 16 | June 1–2, 1996 | B | — | 4 |
|  |  | C | — | 2 |
|  |  | — | — | 7 (control) |
| 17 | June 2, 1996 | B | D**** | 7 |
| 18 | June 7, 1996 | ethylcellulose (1%) | — | 3 |
|  |  | PEG 20000 (5%) | — | 3 |
|  |  | pece (5%) | — | 3 |
| 19 | June 8, 1996 | A | D+ | 16 |
| 20 | June 14, 1996 | PVP 2%/EtOH | D | 5 |
| 21 | June 16, 1996 | PVP multiple applications | D+ | 11 |

TABLE 2

(MAY 28, 1996)

| No. | Partial Detachment of Seeds | Total Detachment of Seeds | Distortion of Ball |
|---|---|---|---|
| 1 | 10/15 | 0/15 | 4/15 |
| 2 | 3/9 | 0/9 | 0/9 |
| 4 | 0/12 | 1/12 | 0/12 |
| 6 | 3/9 | 0/9 | 0/9 |
| 9 | 1/6 | 0/6 | 0/6 |

Other groups are all intact.

TABLE 3

(JUNE 2, 1996)

| No. | Partial Detachment of Seeds | Total Detachment of Seeds | Distortion of Ball |
|---|---|---|---|
| 1 | 10/15 | 0/15 | 4/15 |
| 2 | 3/9 | 1/9 | 2/9 |
| 3 | 0/17 | 0/17 | 1/17 |
| 4 | 0/12 | 1/12 | 0/12 |
| 6 | 4/9 | 0/9 | 0/9 |
| 9 | 1/6 | 0/6 | 0/6 |

Other groups are all intact.

TABLE 4

(JUNE 10, 1996)

| No. | Partial Detachment of Seeds | Total Detachment of Seeds | Distortion of Ball | Intact |
|---|---|---|---|---|
| 1 | 10/15 | 0/15 | 6/15 | 4/15 |
| 2 | 4/9 | 2/9 | 3/9 | 5/9 |
| 3 | 1/17 | 1/17 | 3/17 | 14/17 |
| 4 | 0/12 | 1/12 | 1/12 | 11/12 |
| 5 | 2/9 | 0/9 | 1/9 | 7/9 |
| 6 | 4/9 | 1/9 | 4/9 | 3/9 |
| 7 | 0/9 | 0/9 | 0/9 | 9/9 |
| 8 | 2/8 | 0/8 | 1/8 | 6/8 |

TABLE 4-continued (JUNE 10, 1996)

| No. | Partial Detachment of Seeds | Total Detachment of Seeds | Distortion of Ball | Intact |
|---|---|---|---|---|
| 9 | 2/6 | 0/6 | 0/6 | 4/6 |
| 10 | 0/11 | 0/11 | 0/11 | 11/11 |
| 11 | 0/4 | 0/4 | 0/4 | 4/4 |
| 12 | 0/6 | 0/6 | 0/6 | 6/6 |
| 13 | 0/9 | 0/9 | 0/9 | 9/9 |
| 14 | 1/4 (acc) | 0/4 | 0/4 | 3/4 |
| 15 | 0/13 | 0/13 | 0/13 | 13/13 |
| 16 | all balls are hung down and appear still intact | | | |
| 17 | 1/7 | 0/7 | 0/7 | 6/7 |
| 18 | all groups show intact balls | | | |
| 19 | 0/16 | 0/16 | 0/16 | 16/16 | acc: damaged by accident.

TABLE 5

(JUNE 23, 1996)

| No. | Days After Treatment | Partial Detachment of Seeds | Total Detachment of Seeds | Distortion of Ball | Intact |
|---|---|---|---|---|---|
| 1 | (43) | 10/15 | 0/15 | 6/15 | 4/15 |
| 2 | (36) | 4/9 | 2/9 | 3/9 | 5/9 |
| 3 | (36) | 3/17 | 1/17 | 3/17 | 13/17 |
| 4 | (36) | 0/12 | 1/12 | 1/12 | 11/12 |
| 5 | (36) | 2/9 | 1/9 | 1/9 | 6/9 |
| 6 | (29) | 4/9 | 1/9 | 4/9 | 3/9 |
| 7 | (29) | 0/9 | 0/9 | 0/9 | 9/9 |
| 8 | (29) | 1/8 | 0/8 | 1/8 | 7/8 |
| 9 | (28) | 2/6 | 0/6 | 0/6 | 4/6 |
| 10 | (28) | 0/11 | 0/11 | 0/11 | 11/11 |
| 11 | (27) | 0/4 | 0/4 | 0/4 | 4/4 |
| 12 | (26) | 0/6 | 0/6 | 0/6 | 6/6 |
| 13 | (24) | 0/9 | 0/9 | 0/9 | 9/9 |
| 14 | (22) | 1/4 (acc) | 0/4 | 0/4 | 3/4 |
| 15 | (21) | 2/13 | 0/13 | 0/13 | 11/13 |
| 16 | (21–22) | al balls are hung down and appear still intact | | | |
| 17 | (21) | 1/7 | 0/7 | 0/7 | 5/7 |
| 18 | (16) | all groups show intact balls (all stained June 15) except one (acc) in Ethylcellulose | | | |
| 19 | (15) | 0/16 | 0/16 | 0/16 | 16/16 |
| 20 | (9) | 0/5 | 0/5 | 0/5 | 5/5 |
| 21* | (7) | 0/11 | 0/11 | 0/11 | 11/11 |

*These balls stained substantially darker than single application of PVP 918) and much darker than paint only;
acc: damaged by an accident.

TABLE 6

(JUNE 30, 1996)

| No. | Days After Treatment | Partial Detachment of Seeds | Total Detachment of Seeds | Distortion of Ball | Intact |
|---|---|---|---|---|---|
| 1 | (50) | 10/15 | 0/15 | 6/15 | 3/15 |
| 2 | (43) | 4/9 | 2/9 | 3/9 | 5/9 |
| 3 | (43) | 3/17 | 1/17 | 3/17 | 13/17 |
| 4 | (43) | 0/12 | 1/12 | 1/12 | 10/12 |
| 5 | (43) | 2/9 | 1/9 | 1/9 | 6/9 |
| 6 | (36) | 4/9 | 1/9 | 4/9 | 3/9 |
| 7 | (36) | 0/9 | 0/9 | 0/9 | 9/9 |
| 8 | (36) | 1/8 | 0/8 | 1/8 | 7/8 |
| 9 | (35) | 3/6 | 0/6 | 0/6 | 3/6 |
| 10 | (35) | 0/11 | 0/11 | 0/11 | 11/11 |
| 11 | (34) | 0/4 | 0/4 | 0/4 | 4/4 |
| 12 | (33) | 0/6 | 0/6 | 0/6 | 6/6 |

TABLE 6-continued (JUNE 30, 1996)

| No. | Days After Treatment | Partial Detachment of Seeds | Total Detachment of Seeds | Distortion of Ball | Intact |
|---|---|---|---|---|---|
| 13 | (31) | 0/9 | 0/9 | 0/9 | 9/9 |
| 14 | (29) | 1/4 (acc) | 0/4 | 0/4 | 3/4 |
| 15 | (28) | 2/13 | 0/13 | 0/13 | 11/13 |
| 16 | (28–29) | all balls hung down are intact except for 1 (B) showing a slight sign of achene detachment | | | |
| 17 | (28) | 2/7 | 0/7 | 0/7 | 5/7 |
| 18 | (23) | all groups show intact balls (all stained June 15) except one (acc) in Ethyl cellulose | | | |
| 19 | (22) | 0/16 | 0/16 | 0/16 | 16/16 |
| 20 | (16) | 0/5 | 0/5 | 0/5 | 5/5 |
| 21* | (14) | 0/11 | 0/11 | 0/11 | 11/11 |

*These balls stained substantially darker than single application of PVP (18) and much darker than paint only;
acc: damaged by an accident.

TABLE 7

(JULY 21, 1996)

| No. | Days After Treatment | Partial Detachment of Seeds | Total Detachment of Seeds | Distortion of Ball | Intact |
|---|---|---|---|---|---|
| 1 | (71) | 10/15 | 0/15 | 6/15 | 3/15 |
| 2 | (64) | 4/9 | 2/9 | 3/9 | 5/9 |
| 3 | (64) | 3/17 | 1/17 | 3/17 | 13/17 |
| 4 | (64) | 1/12 | 1/12 | 1/12 | 9/12 |
| 5 | (64) | 3/9 | 1/9 | 1/9 | 5/9 |
| 6 | (57) | 4/9 | 3/9 | 4/9 | 2/9 |
| 7 | (57) | 0/9 | 0/9 | 0/9 | 9/9 |
| 8 | (57) | 1/8 | 0/8 | 1/8 | 7/8 |
| 9 | (56) | 3/6 | 0/6 | 0/6 | 3/6 |
| 10 | (56) | 0/11 | 0/11 | 0/11 | 11/11 |
| 11 | (55) | 0/4 | 1/4 (acc) | 1/4 (acc) | 3/4 |
| 12 | (54) | 0/6 | 0/6 | 0/6 | 6/6 |
| 13 | (52) | 0/9 | 0/9 | 0/9 | 9/9 |
| 14 | (50) | 1/4 (acc) | 0/4 | 0/4 | 3/4 |
| 15 | (49) | 2/13 | 0/13 | 0/13 | 11/13 |
| 16 | (49–50) | 1 (B) & 2 (cont) showing slight achene detachment | | | |
| 17 | (49) | 2/7 | 0/7 | 0/7 | 5/7 |
| 18 | (44) | all stained on June 15, partial detachment 1 (PEG) & 1 (PECE), one acc (Ethyl cellulose) | | | |
| 19 | (43) | 0/16 | 0/16 | 0/16 | 16/16 |
| 20 | (37) | 0/5 | 0/5 | 0/5 | 5/5 |
| 21* | (35) | 0/11 | 0/11 | 0/11 | 11/11 |

* These balls stained substantially darker than single application of PVP (18) and much darker than paint only;
acc: damaged by an accident Based on the observations reported above, the following conclusions were drawn:

(1) without applying an adhesive or coloring agent to the cutting, the achene structures generally do not detach from the receptacle until more than four weeks after the achene assembly opens, if the cutting is maintained hanging upside down and is not disturbed.

(2) if coloring agent is applied to the cutting without having previously applied adhesive to the cutting, the achene structures do not detach from the receptacle for more than one month, but the coloration of the achene assembly is lighter than in the case of cuttings which were treated with adhesive.

(3) in instances where adhesive is applied to the cutting in addition to applying coloring agent to the cutting, better coloration is obtained. In addition, multiple applications of adhesive prior to application of the coloring agent provides increasingly darker staining without impairing the natural appearance of the cutting.

(4) in one case, application of adhesive provided a thick coating over the achene assembly to modify the appearance of the decorative article—the thick coating also provided richer staining by the coloring agent. As a result, the finished articles resemble flowers such as marigolds and carnations (depending on the color of the coloring agent).

Although the decorative articles, the methods for making the decorative articles, and the kits for use in making the decorative articles in accordance with the present invention have been described in connection with preferred embodiments, it will be appreciated by those skilled in the art that modifications not specifically described may be made without departing from the spirit and scope of the invention defined in the following claims.

What is claimed is:

1. A method of making a decorative article, comprising:
    applying adhesive and coloring agent to a plant, said plant comprising a stalk and an achene assembly, said achene assembly comprising a receptacle and a plurality of pappus structures; and then drying said adhesive and coloring agent.

2. A method as recited in claim 1, further comprising inserting a supporting element into said stalk of said plant and into said receptacle of said plant.

3. A method as recited in claim 2, wherein said step of inserting a supporting element is conducted after said step of applying adhesive and coloring agent.

4. A method as recited in claim 1, wherein said steps of applying adhesive and coloring agent and drying said adhesive and coloring agent are conducted by applying said adhesive to said plurality of achene structures, then drying said adhesive, then applying said coloring agent to said plurality of achene structures, and then drying said coloring agent.

5. A method as recited in claim 1, further comprising cutting said stalk of said plant while said achene assembly of said plant is in a closed arrangement to obtain a cutting, placing said cutting in water and leaving said cutting in water until said achene assembly changes to an open arrangement, before conducting said step of applying adhesive and coloring agent.

6. A method as recited in claim 1, wherein said plant is a dandelion.

* * * * *